United States Patent Office
3,329,817
Patented July 4, 1967

3,329,817
RADIATION SOURCE
Richard N. Walz, White Bear Lake, Minn., assignor to Minnesota Mining and Manufacturing Company, St. Paul, Minn., a corporation of Delaware
No Drawing. Filed Mar. 13, 1964, Ser. No. 351,823
6 Claims. (Cl. 250—106)

This invention relates to radiation sources and more particularly to essentially planar, high intensity radiation sources with high integrity.

It is known that ceramic materials can be plated with metals, either by electroless or by electrodeposition techniques. Further, it is known that radiation sources can be fabricated by electroplating a metallic radioisotope onto a metallic surface, and the latter may, if desired, be further protected by electrodeposition of a chemically resistant metal over the radioisotopic material. Such methods have not, however, produced sources of extremely high intensity with concomitant high integrity, so far as the applicant is aware.

It is an object of this invention to prepare mechanically strong, high temperature resistant planar type radiation sources.

Another object of the invention is to provide radiation sources having high efficiency.

It is a further object of the invention to provide a unique and expeditious, convenient process for the production of such radiation sources.

Other objects of the invention will become apparent from the disclosures hereinafter made.

In accordance with the above and other objects of the invention, it has now been found that ceramic particles comprising or containing radioactive substances, for example, radioisotopes, can be fabricated into radiation sources of high integrity and extremely advantageous properties by utilizing metal plating processes to bond the particles to suitable substrates.

The articles thus produced are firmly held to whatever backing is selected, and, by a proper choice of metals to be exposed to the conditions of use, they can be protected from loss or scattering of the radioactive particles which may be occasioned by abrasion or corrosion. Further, after intitial fabrication steps, the bonding metal can be removed in part from preselected portions of the ceramic particles, to produce radiation sources in which there is little or no self-absorption of the radioactive properties in the area in which the ambient fluid, for example air, or other gases or liquids to be treated by means of radioactive radiation, impinge on the sources.

Broadly speaking, the process of the invention is carried out by providing a self-supporting substrate, which is adapted to deposition of metal thereupon from a plating solution. Next, ceramic particles of radioactive material, or containing radioactive material, are treated to provide them with an electrically conducting surface coating, and these are scattered over the surface of the substrate in such a way that they are closely associated but not necessarily in contact with each other. Without disturbing the physical rationship of particles and substrate, they are bonded to the substrate by a metal plating process. This can be an electroless process, or the assembly can be brought into contact with an electrolyte solution, made the cathode by connection to a direct current source, and subjected to electroplating, using a suitable anode, to produce a continuous electrodeposited coating over the particles and the substrate. If desired, an initial layer of one metal can be followed by deposition of a layer of a second or third metal, as desired. The term "plated bond" as used in the claims means that the bonding metal has been deposited by electroplating or by electroless plating.

The radioisotopic particles which are employed can be of themselves ceramics, including such materials as strontium 90 titanate; porous ceramic particles having radioactive materials adsorbed in the pores, or ion-exchanged therein, such as those described in United States Patent No. 2,918,700, or as described in British Patent No. 917,649, or any similar materials. The main criterion is that the ceramic material employed be inert to and substantially insoluble in the plating solutions which are used. Generally only one radioisotope is present, but several radioisotopes can be contained within or form part of the particles, if desired for spectial purposes.

Preferably, spherical particles are employed, for reasons which will appear later, but beads, spheroids, platelets or any other shape of particle can be used. These particles are preferably of small size, of the order of 10 to 200 microns in largest dimension. Again desirably, any particular size of particles employed is limited to a size range difference of not more than about 35 microns; e.g., particles from 10 to 40 microns, from 45 to 105 microns, or 105 to 150 microns are employed, accordingly as larger sizes are to be used in a particular application. Nevertheless, if mixtures of particles of widely varying sizes are empolyed, for particular purposes, articles made by the process of the invention employing such widely differing size ranges are to be considered as part of the invention.

By the term "planar" as used herein is meant that the radioactive particles are held on a sheet in a layer essentially one particle thick. The sheet or base need not be flat, although the process of producing these articles may be more conveniently carried out starting with flat sheets.

To render the ceramic particles electrically conducting, so that electrodeposition of metals can be employed to bind them to the substrate base, they ordinarily first must be coated with an electrically conductive material. Such materials include graphite, metal powders, vapor deposited metal or electrochemically deposited metal and the like.

One convenient method of individually coating the surface of discrete ceramic particles to make them electrically conductive is to deposit a thin layer of metal upon the individual particle surfaces.

For example, a nickel coating is first applied to the selected radioactive particles, e.g. radiating ceramic microspheres. Such a nickel coating can be applied by electroless coating methods such as those described by Brenner et al. in Metal Finishing, vol. 52, pp. 61–76 (November and December 1954). Reference may also be made to U.S. Patents Nos. 2,690,402; 2,532,283; 2,532,284; 2,454,610 and the following articles: bulletin entitled Electroless Plating, published by the U.S. Department of Commerce, National Bureau of Standards, March 1, 1958; Plating, V. 44, pp. 12–17, December 1957, C. H. deMinjer and A. Brenner; and J. Research of National Bureau of Standards, V. 37, p. 31, 1946; and V. 39, p. 385, November 1957, Brenner and Riddell. Other metals can be deposited in a similar manner.

EXAMPLE 1

A planar radiation source utilizing strontium 90 is prepared as follows: ceramic microspheres approximately 50 microns in diameter, containing 100 millicuries of strontium 90 per gram (produced by absorbing Sr 90 from an aqueous solution of strontium 90 chloride on hydrochloric acid-leached spherules of zirconium phosphate glass, followed by firing at about 1000° C. to sinter the spherules to close the pores), are soaked in a 10% aqueous solution of stannous chloride, then without drying are treated with a palladium chloride solution containing about 1 gram of palladium chloride per liter of water. The microspheres thus treated are removed from the solution and while still wet are added to an electroless nickel-plating bath containing the following ingredients:

| | | |
|---|---|---|
| $NiCl_2 \cdot 6H_2O$ | grams | 30 |
| $NaC_2H_3O_3$ | do | 50 |
| $Na_2H_2PO_2 \cdot H_2O$ | do | 10 |
| Water, to 1000 ml. | | |
| pH | | 4–4.5 |

The bath is heated to about 200° F. The microspheres are stirred in the bath for about 1 hour at that temperatures, then removed, washed with distilled water and dried. A nickel coating about 5 to 8 microns thick is formed on the microspheres.

A stainless steel plate about 2 inches square, having a previously formed thin nickel-plated surface is first cathodically cleaned with aqueous 10% sodium hydroxide solution and the nickel surface is then activated by making the plate the anode in a 5% sulfuric acid solution for 30 seconds at 6 volts. This sheet, which will form the substrate for the planar source, is then mounted wet into a holding fixture with the activated nickel surface uppermost, with care not to contaminate the surface in any manner. The previously electrochemically nickel-plated beads prepared above are then spread on the base in a layer which is one bead thick, and the beads being uniformly dispersed out of contact with each other. The theoretical amount required to cover the plate in a monolayer, with the microspheres touching each other, is about 60 mg. per square inch. Normally, about 10 mg. of microspheres per square inch are used; this amount can be varied according to the intensity of radiation required. The assembly is then gently immersed into a standard Rochelle salt copper-plating solution. The base in its holding fixture is made the cathode, the solution is maintained at about 60° C. and the cathode current density is about 5 milliamperes per square centimeter, using a copper anode. plating is continued for about 15 minutes. After this time, it is found that the beads are firmly attached by the copper strike, so that they can no longer be washed off under running water. The base is then removed from the holder, carefully washed, and placed in a conventional nickel sulfamate electroplating bath. The base is made the cathode, and nickel plating is continued at 15 milliamperes per square centimeter cathode current density. About 15 to 20 minutes of plating at this current density provides a source in which the beads are bonded to the base by nickel metal, which will withstand hard scrubbing with a sponge.

Another embodiment of the radiation sources of the invention is produced as follows: microspheres having a nickel coating about 5 to 8 microns thick, produced as set forth above, are distributed uniformly in a monolayer (about 10 mg. per square inch) on an activated, nickel-plated stainless steel plate. The assembly is carefully lowered into an electroless plating bath as set forth above, so as not to displace the microspheres. Treatment in the electroless plating bath, held at about 200° F., is continued for about 30 minutes. After this, the assembly is washed with a detergent solution, then with distilled water and dried. The microspheres are uniformly coated with nickel and are bonded to the stainless steel plate by electrolessly deposited nickel.

EXAMPLE 2

About 10 milligrams of ceramic microspheres produced as set forth in Example 1, approximately 50 microns in diameter, and containing Sr 90 in amount of about 3 curies/gram, suitable for use as a source of beta radiation, are placed upon a nickel sheet approximately 1" x 1" and approximately 0.030 inch thick, to provide a planar source of radiation as follows.

The beads are first treated in a reducing solution having the following formula:

| | | |
|---|---|---|
| Sodium hypophosphite | grams | 10 |
| Sodium acetate | do | 10 |
| Sodium lauryl sulfate | gram | 0.1 |
| Water to make 1 liter. | | |
| pH | | 4 to 6 |

The bath is heated to a temperature of about 85 to 90° C., and the beads are gently agitated in the bath for about 30 minutes. The treated beads are rinsed several times by swirling them in distilled water and decanting. Then they are treated by gentle agitation for 5 minutes in a solution having the composition

| | | |
|---|---|---|
| $SnCl_2 \cdot 2H_2O$ | grams | 70 |
| Conc. HCl | ml. | 100 |
| Sodium lauryl sulfate | gram | 0.1 |
| Water to make 1 liter. | | |

The beads are then washed thoroughly with distilled water, the water decanted off and the beads placed in a solution containing 10 grams of silver nitrate in 1 liter of water. They are swirled gently for 5 minutes, then rinsed thoroughly and placed in a solution containing 0.1 gram of palladium chloride and 1 ml. of concentrated hydrochloric acid in a liter of water. After rinsing thoroughly, the wet beads are placed in a hot nickel plating bath having the composition set forth in Example 1, and maintained in the bath with stirring at about 200° F. for about 1 hour. A uniform nickel plating covers the surfaces of the beads.

The nickel plate to be used as a backing or base is mechanically polished on a buffing wheel to a satin finish. The buffed plate is degreased with a chlorinated solvent and then anodically cleaned in a solution containing 15 grams of sodium carbonate and 22 grams of sodium hydroxide per liter of water. The plate is then rinsed with copious quantities of water and anodically etched in a solution containing 86 milliliters of concentrated hydrochloric acid in 1 liter of water. The plate is then fixed in the bottom of a plating bath which contains an aqueous solution of 300 grams per liter of nickel fluoborate, 30 grams per liter of boric acid and has pH 2.0–3.5. The previously electrolessly nickel-plated beads are placed on the cleaned surface of the base plate in any desired arrangement, but preferably one layer of beads thick. The base plate is then made the cathode and electroplating is carried on with a nickel anode at 10 milliamperes per square centimeter for about 20 minutes.

A stronger bond and improved wipe test results are obtained when the ceramic beads previously cleaned and activated are immersed in the electroless nickel plating bath for about 10 minutes, and then placed on the base plate and plated for about 5 minutes in a nickel sulfamate plating bath at 15 milliamperes per square centimeter, followed by returning the base plate with the beads slightly bonded thereto to the electroless plating bath for about 10 minutes at 200° F. Thereafter the assembly is again plated for 5 minutes in a fresh nickel sulfamate plating bath at 15 milliamperes per square centimeter. The assembly is scrubbed with an aqueous solution containing a detergent and a few percent of ethylene diamine tetracetic acid after the second 10 minute electroless plate.

EXAMPLE 3

A planar source is usefully made to have uniform distribution of radiation by employing a screen for the base. Woven screens or photo-etched or otherwise prepared screens can be employed, but etched screens are preferred because of their smooth surfaces and uniform opening size, particularly when openings smaller than 50 microns are employed.

Ceramic microspheres having diameters in the range of 35±5 microns are employed, containing strontium 90 as a radioisotope for furnishing beta radiation. An etched nickel screen having circular openings approximately 30 microns in diameter, the screen being 1 mil thick and approximately 1 x 1 inch square, is used. The ceramic microspheres are first nickel plated electrolessly as set for in Example 1. The nickel screen is then cleaned as in Example 2, immersed in a nickel plating bath, with a nickel anode, and the previously plated microspheres are placed on the screen in such a way that all of the openings are filled, but no excess beads remain on the surface. An initial light nickel plating is produced by operating the screen as a cathode at a current density of approximately 10 milliamperes per square centimeter for about 5 minutes. The screen is then reoriented in the plating bath so that the back of the screen faces the nicked anode. Plating is then continued at about 15 milliamperes per square centimeter for about 30 minutes. In this way, a heavy bond for holding the beads is formed around the base of the beads and on the back of the screen, leaving a thin covering over the face of the beads whereby improved radiation escape efficiency is attained.

When screens are employed as backings, it will be apparent that a certain amount of deformation of the screen (preforming into shapes other than flat sheets) can be present, as the particles are held in the holes against considerable angles of inclination. Angular particles are of course less likely to be displaced.

EXAMPLE 4

A particularly useful embodiment of the invention is produced by electroforming the base plate on the plated particles themselves. This is done by employing a temporary support, as follows.

A non-conducting base such as plastic or glass, from which the source ultimately can be stripped, is employed as the temporary support. Thus a thin polymethylmethacrylate sheet, approximately 2 by 3 inches, with a flat surface, is first sandblasted lightly to deglaze the surface. The surface is then cleaned by soaking the sheet in a hot 10% aqueous sodium hydroxide solution for about 10 minutes. After cleaning, the plastic sheet is successively immersed in 10% aqueous stannous chloride, palladium chloride and an electroless nickel-plating bath as set forth hereinabove. A 5 to 10 micron thick nickel plate is thus placed upon the surface of the lucite sheet. The plated sheet is then surface activated by making it the anode in a 5% sulfuric acid solution, applying 6 volts for 15 seconds. The activated sheet is then mounted horizontally in a holder, and ceramic particles containing a radioactive isotope previously electrolessly nickel-plated as in Example 1, are uniformly distributed in a single layer over the entire surface activated portion of the sheet. This assembly is immersed in a sulfamate nickel-plating bath, and plated at about 15 amperes per square centimeter for about 30 minutes. In this way, a metal thickness of approximately 3 mils is built up, which is self-supporting when stripped from the plastic sheet. If a sufficient thickness has not been deposited, or a thicker support is desired, plating is continued to the desired point. The metal is then stripped from the plastic sheet. The side previously adjacent to the temporary support has a thin "window," which in addition to being efficient with respect to the escape of radiation, is also substantially free from any radioactive contamination, because the window was plated before any radioactive isotopes were placed thereon. In this way, surface contamination from the plating bath is substantially avoided.

EXAMPLE 5

When alpha and low energy beta sources are prepared by the process of the invention, it may be found that the amount of plating required to firmly bond the plated particles to the metallic base is too thick to provide for good efficiency. A further step may be employed to improve the radiative efficiency level. The procedure is as follows.

A radiation source according to Example 1, utilizing americium 241 as the isotope, for the production of alpha radiation, is first produced. The resulting flat source is coated over its entire surfaces with a layer of acrylic polymer as a 30% solution in methylethylketone. Attention is particularly given to the surface to which the beads are bonded, so that the area between and around the exposed portions of the beads is completely filled in. Then, using methylethylketone, the organic coating is removed from the tops of the beads. The thus coated source is immersed in a dilute nitric acid solution (15 ml. of concentrated nitric acid and 85 ml. of water). The source is inspected frequently to determine the extent of the etch, care being taken so that the nickel is not completely removed from the exposed portion. When the desired amount of metal has been removed, i.e., when the metal film has been reduced to about 1 to 2 microns in thickness, the source is removed from the acid etch, thoroughly washed with distilled water, and dried. The organic coating is then removed, by washing with methylethylketone. The resulting source has especially good efficiency while retaining the radioisotope firmly bound to the surface, as shown by wipe tests.

Using the same technique, the electroformed source according to Example 4 can be etched very advantageously as follows:

The back only of the electroformed source is coated with the organic resin before etching. The coated source is then immersed in a dilute nitric acid solution, with careful observation from time to time to note the course of the removal of metal. It is found that the metal deposited from the sulfamate nickel plating bath etches faster than the electroless deposit. Accordingly, the initial surface deposit which was placed upon the plastic sheet to provide a temporary support for the particles is removed together with the plated deposit around the particles, before the electrolessly deposited nickel on the particles themselves is completely removed. Depending upon the original thickness of the electroless deposit on the particles, and of course, with regard to the necessary strength of the bond so that the particles remain firmly held to the surface of the electroformed nickel support, etching is preferably continued to a point short of complete removal of the electroless deposit on the particles. It is found that a source in which promethium 147 is used as the radiation emitter, contained in ceramic microspheres, has a radiation intensity 3 times that of the source immediately after completion. The ceramic particles are still protected by a nickel coating in the etched areas.

If desired, of course, etching can be continued until all of the metal is removed from the top portions of the particles, as long as enough metal has been deposited to bond the particles so that bonding metal remains after etching.

Copper and nickel plating have been described in these examples, but other metals can of course be employed. Electroless plating with silver, copper, cobalt, gold and the like are useful. Conductive oxides can be deposited on the surfaces of the particles, as well as graphite or powdered metals, by known coating processes. Plating of the resulting particles, on a conductive backing, to bond them thereto, can be carried out with gold, nickel, copper and the like.

Fired clay containing radioisotopes as described in United States Patent 2,918,700 can be utilized in the process described in the preceding examples. While extruded rods as shown therein, if of small dimensions, can be employed as such, generally the fired material is ground as by ball milling, screened to obtain particles of desired mesh sizes (preferably uniform in size) and used instead of the spherical particles.

While more or less flat sheets have been employed to illustrate the radiation sources which can be formed by metal bonding as shown herein, it will readily be apparent to the art that other embodiments can be produced by this process, and that the flat sheets which are produced in Examples 1 through 5 can be bent, soldered, coated over over only a portion of their surfaces with radioactive particles, and can be otherwise shaped, within reasonable limits, short of dislodging particles or weakening the metal bond, to provide such articles as tubes with the radiating surface on the inside or outside, half-cylinders, square conduits, channels, and the like. Such embodiments are within the scope of the invention, and are included within the scope of the appended claims.

What is claimed is:

1. A radiation source comprising, in combination, a ceramic particle comprised of a radioactive isotope having an adherent electrically conductive coating over at least a part of the surface thereof, and a support for said particle consisting of a self-supporting substrate; said particle being firmly attached to said substrate by a plated metallic bond between at least a part of said conductively coated surface and said substrate.

2. A radiation source comprising, in combination, a radioactive ceramic particle having an adherent metallic coating over substantially all of the surface thereof, and a support for said particle consisting of a solid substrate; said particle being firmly attached to said substrate by a plated metallic bond between at least a part of said conductively coated surface and said substrate.

3. A radiation source comprising, in combination, a radioactive ceramic particle having an adherent nickel coating over substantially all of the surface thereof, and a support for said particle consisting of a self-supporting substrate; said particle being firmly attached to said substrate by plated nickel as a bond between at least a part of said nickel coating and said substrate.

4. A radiation source comprising, in combination, radioactive substantially spherical ceramic particles having an adherent nickel coating over at least a part of the surface of each particle, and a sheet-like metallic support for said particles; said particles being disposed over said sheet in a monolayer and being firmly attached to said sheet by plated nickel as a bond between at least a portion of the nickel-coated surfaces of the said particles and the said sheet.

5. A radiation source comprising, in combination, ceramic particles comprised of a radioactive isotope having an adherent electrically conductive coating over at least a part of the surface thereof, and a support for said surface consisting of an electrically conductive sheet having apertures therein smaller in diameter than said particles; said particles being positioned by said apertures and being firmly bonded to said sheet by a plated metallic bond between at least a part of said electrically conductive coating and said sheet.

6. A radiation source comprising, in combination, ceramic spherules comprised of a radioisotope, each of said particles having an adherent electrically conductive coating over at least part of the surface thereof, disposed in a monolayer on a self-supporting substrate; said particles being firmly attached to said substrate by a plated metallic bond between at least a part of said conductive coating and said substrate.

References Cited

UNITED STATES PATENTS

| | | | |
|---|---|---|---|
| 2,836,548 | 5/1958 | Gray et al. | 204—48 X |
| 3,088,892 | 5/1963 | Cain et al. | |
| 3,165,422 | 1/1965 | Stoughton et al. | 264—0.5 X |
| 3,175,922 | 3/1965 | Blocker et al. | 117—100 |
| 3,203,877 | 8/1965 | Facquet et al. | 204—49 |
| 3,230,150 | 1/1966 | Martin et al. | 176—82 X |

FOREIGN PATENTS

| | | |
|---|---|---|
| 854,825 | 11/1960 | Great Britain. |

L. DEWAYNE RUTLEDGE, *Primary Examiner.*

LEON D. ROSDOL, BENJAMIN R. PADGETT, *Examiners.*

L. A. SEBASTIAN, *Assistant Examiner.*